Patented Apr. 30, 1946

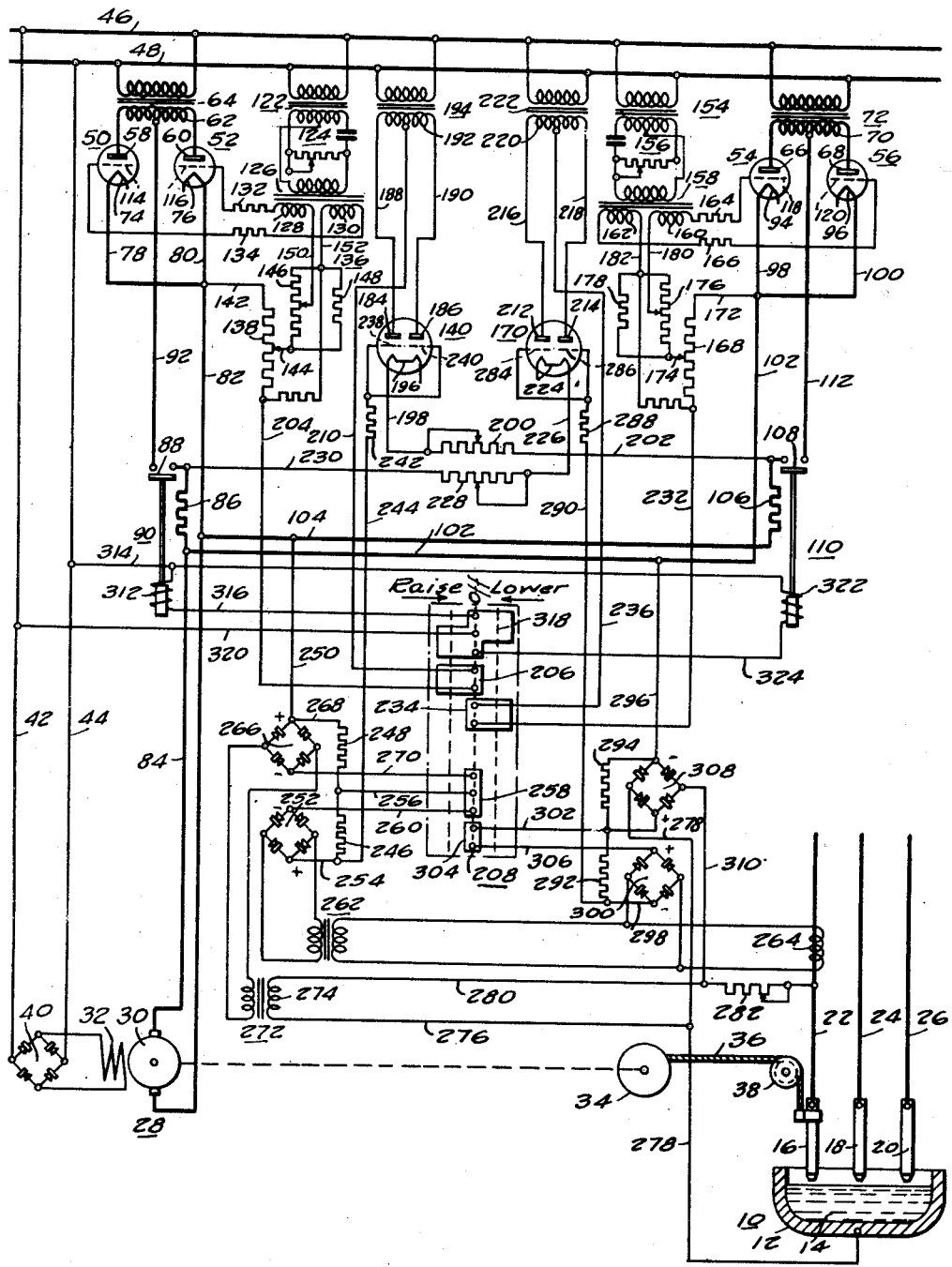

2,399,388

UNITED STATES PATENT OFFICE 2,399,388

REGULATING SYSTEM

Jack E. Reilly, Pittsburgh, Pa., assignor to Westinghouse Electric Corporation, East Pittsburgh, Pa., a corporation of Pennsylvania Application April 27, 1944, Serial No. 533,081

10 Claims. (Cl. 314—64)

This invention relates to regulating systems and in particular, to arc furnace regulating systems.

An object of this invention is the provision of a quick response, sensitive arc furnace regulating system.

Another object of this invention is to provide in a regulating system which utilizes a plurality of pairs of electric discharge valves for selectively controlling the operation of a dynamo-electric machine, for preventing one pair of electric valves from conducting when the other pair is conducting.

Other objects of this invention will become apparent from the following description when taken in conjunction with the accompanying drawing, the single figure of which is a diagrammatic view of an arc furnace regulating system embodying the teachings of this invention.

Referring to the drawing, an electric furnace 10 is illustrated, the furnace comprising a receptacle 12 containing a bath 14 of metallic material and three movable electrodes 16, 18, and 20, which are connected by conductors 22, 24, and 26, respectively, to a source of polyphase power (not shown).

Each of the movable electrodes is provided with a reversible motor for raising and lowering it and an electronic regulating system for governing the operation of the motor in accordance with predetermined changes in the current flowing through the electrode and the potential across the arc. Since the electronic regulating system associated with each of the motors is of like construction and operates in the same manner, only one of the regulating systems and the motor for controlling the position of one of the electrodes is illustrated.

In the drawing, a reversible motor 28 comprising an armature 30, and a separately excited field winding 32 is illustrated for raising and lowering the electrode 16. The armature 30 is mechanically connected to the electrode 16 by any suitable means for effecting movement thereof, a winding drum 34 being illustrated as being connected to the motor armature 30 and disposed for winding a flexible cable 36 which passes over a pulley 38 and is secured to the electrode 16. The field winding 32 is connected through a rectifying bridge circuit 40 and by conductors 42 and 44 across a source of supply, represented by conductors 46 and 48, respectively.

In order to control the energy in the load circuit, suitable means may be provided for controlling the direction and amount of current flowing through the armature windings 30 of the motor 28 to control the positioning of the electrode 16. In the embodiment illustrated, the electric discharge devices 50, 52, and 54, 56 are connected in paired relation in a well known manner so as to provide for complete rectification of the alternating current from the source of supply 46 and 48 to supply unidirectional current to the motor 28 in a predetermined direction. Thus, the anodes 58 and 60 of electric discharge valves 50 and 52 respectively, are connected to the terminals of the secondary winding 62 of transformer 64, the primary windings of which are connected across the supply conductors 46 and 48. Likewise the anodes 66 and 68 of the electric valves 54 and 56, respectively, are connected to the terminals of the secondary winding 70 of the transformer 72, the primary windings of which are connected across the supply conductors 46 and 48.

As illustrated, the cathodes 74 and 76 of the electric valves 50 and 52, respectively, are connected by conductors 78 and 80, respectively, through conductor 82 to one side of the armature 30, the other side of the armature being connected by conductor 84 through a blocking resistor 86, the purpose of which will be explained more fully hereinafter, the contact member 88 of a contactor 90, and conductor 92 to the center or mid-tap of the secondary winding 62 of the transformer 64. In a similar manner, the cathodes 94 and 96 of the electric discharge valves 54 and 56, respectively, are connected by conductors 98 and 100, respectively, to and through conductor 102 and conductor 84 to one side of the armature windings 30, the other side of the armature windings 30 being connected through conductor 82, conductor 104, blocking resistor 106, the contact member 108 of contactor 110, and conductor 112 to the mid or center-tap of the secondary winding 70 of transformer 72.

As illustrated, provision is made to control the bias of the grids 114, 116, 118, and 120, of the electric discharge valves 50, 52, 54, and 56, respectively, in accordance with predetermined operating conditions of the furnace 10. An alternating-current potential is normally supplied to the grids 114 and 116 of the electric valves 50 and 52, respectively, from the source of supply 46 and 48 through the transformer 122, the phase-shifting circuit 124, and the grid transformer 126. As illustrated, the grid transformer 126 is provided with two secondary windings 128 and 130, one terminal of the secondary winding 128 being connected through a resistor 132 to the grid 118 of the valve 52, and one terminal of the secondary winding 130 being connected through the resistor 134 to the grid 114 of the electric valve 50. The other terminals of the secondary windings 128 and 130 are connected into a balancing resistor grid circuit 136.

The electric discharge valves 50, 52, 54, and 56 are of the well known thyratron type, the conductivity thereof being controlled by the grid-cathode potential which is made up of an alternating-current potential superimposed on a direct-current biasing potential so that the resultant grid-cathode potential becomes more positive than the critical potential of the thyratron to render the device conductive. Thus, control of the conductivity of these discharge devices is obtained by varying the direct-current biasing potential.

Again referring specifically to the electric discharge valves 50 and 52, control of the conductivity thereof is obtained by connecting a resistor 138 in the grid-cathode circuit, the resistor 138 being disposed to be connected through a full-wave rectifier discharge valve 140 to the source of supply 46 and 48. As illustrated, part of the resistor 138 is connected by conductor 142 to conductors 78 and 80 and the cathodes 74 and 76, respectively, of the electric valves 50 and 52, respectively, and by the adjustable lead 144 through the resistors 146 and 148 and conductors 150 and 152, respectively, to a terminal of the secondary windings 128 and 130, respectively.

In a like manner, an alternating-current potential is normally supplied to the grids 118 and 120 of the electric discharge valves 54 and 56, respectively, from the source of supply 46 and 48 through a transformer 154, a phase-shifting circuit 156, and a grid transformer 158. The grid transformer 158 is provided with two secondary windings 160 and 162, respectively, one end of the secondary winding 160 being connected through a resistor 164 to the grid 118, and one end of the secondary winding 162 being connected through a resistor 166 to the grid 120. The other ends of the secondary windings 160 and 162 are connected through a resistor balancing bridge 168.

In order to control the bias on the grids 118 and 120 of discharge devices 54 and 56, a resistor 168 is disposed to be connected through a full-wave rectifier discharge valve 170 to the source of supply 46 and 48, a part of the resistor 168 being connected by conductor 172 to the conductors 98 and 100 and the cathodes 94 and 96, respectively, of the electric discharge valves 54 and 56, and by a flexible lead 174 through resistors 176 and 178 of the resistor balancing bridge 168 and conductors 180 and 182, respectively, to an end of the secondary windings 160 and 162, respectively, of the grid transformer 158.

The full-wave rectifier discharge valves 140 and 170 are similar, having two anodes, two grids, and a single cathode. The anodes 184 and 186 of the rectifier discharge valve 140 are connected by conductors 188 and 190, respectively, to the terminals of the secondary winding 192 of the transformer 194, the primary windings of which are connected across the supply conductors 46 and 48. The cathode 196 of the rectifier discharge device or valve 140 is connected by conductor 198 through a self-biasing resistor 200, conductor 202, blocking resistor 106, conductors 104, 82, and 142 to one end of the resistor 138, the other end of the resistor 138 being connected by conductor 204 through a contact plate 206 carried on a master controller 208, the purpose of which will be explained more fully hereinafter, and conductor 210 to the mid or center-tap of the secondary winding 192 of the transformer 194.

Similarly the anodes 212 and 214 of the full-wave rectifier discharge valve 170 are connected by conductors 216 and 218, respectively, to the terminals of the secondary winding 220 of a transformer 222, the primary windings of which are connected across the source of supply 46 and 48. The cathode 224 of the rectifier discharge valve 170 is also connected by a conductor 226 through a self-biasing resistor 228, conductor 230, blocking resistor 86, conductor 102, conductor 172, resistor 168, conductor 232, contact plate 234 of the master controller 208, and conductor 236 to the center or mid-tap of the secondary winding 220 of the transformer 222.

In order to control the conductivity of the rectifier discharge valves 140 and 170, provision is made to control the grid bias of these rectifier valves in accordance with the flow of current through the electrode 16 and the potential across the arc thereof. Thus, the grid biasing circuit of the rectifying discharge valve 140 extends from the grids 238 and 240 through the grid resistor 242, conductor 244, control resistor 246, control resistor 248, conductor 250, conductor 104, blocking resistor 106, conductor 202, self-biasing resistor 200, and conductor 198 to the cathode 196. The resistors 246 and 248 are disposed to have direct-current voltages thereacross proportional to the current through the electrode 16 and to the arc potential, respectively.

In order to impress the direct-current voltage proportional to the current flowing through the electrode 16 across resistor 246, the resistor 246 is disposed to be connected across a rectifying bridge circuit 252, one end of the resistor 246 being connected by conductor 254 to one of the output terminals of the rectifying bridge circuit, and the other end of the resistor 246 being connected by conductor 256 through the contact plate 258 of the master controller 208 and conductor 260 to the other output terminal of the rectifying bridge circuit 252. The input terminals of the rectifying bridge circuit 252 are connected through the transformer 262 across the current transformer 264 connected inductively to the supply conductor 22 for the electrode 16.

In a similar manner, the control resistor 248 is connected across a rectifying bridge circuit 266, one end of the resistor 248 being connected by conductor 268 to one terminal of the rectifying bridge circuit 266, the other end of the resistor 248 being connected by conductor 256 through the contact plate 258 of the master controller 208, and conductor 270 to the other output terminal of the rectifying bridge circuit 266. The rectifying bridge circuit 266 is connected across the transformer 272, one end of the secondary winding 274 being connected by conductors 276 and 278 to the receptacle 12, and the other end of the secondary winding 274 being connected by conductor 280 through the adjustable resistor 282 to the supply conductor 22.

It is to be noted that the rectifying bridges 252 and 266 are connected in opposition so that the direct-current voltages across resistors 246 and 248 are of opposite polarity so that for any variation in the flow of current through the electrode and in the arc potential, the differential of the direct-current voltages across resistors 246 and 248 controls the direct-current biasing potential on the grids 238 and 240 of the full-wave rectifier discharge valve 140.

In a similar manner, the grid biasing circuit for the full-wave rectifying discharge valve 170 includes a pair of sources of control voltage proportional to the current flowing through the electrode 16 and the arc potential. Thus, the grids 284 and 286 of the rectifier valve 170 are connected through a grid resistor 288, conductor 290, control resistor 292, control resistor 294, conductor 296, conductor 102, blocking resistor 86, conductor 230, self-biasing resistor 228, and conductor 226 to the cathode 224.

The control resistor 292 is disposed to have a direct-current voltage impressed thereacross which is proportional to the current flowing through the electrode and is disposed with its one end connected by conductor 298 to one of the output terminals of a rectifier bridge circuit 300, the other end of the control resistor 292 being connected by conductor 302 through the contact plate 304 of the master controller 208 and conductor 306 to the other output terminal of the rectifier bridge circuit 300. The input terminals of the rectifier bridge circuit 300 are connected across the current transformer 264. The control resistor 294 is connected directly across the output terminals of the rectifier bridge 308, one of the input terminals of which is connected by conductor 310 through resistor 282 to conductor 22, the other input terminal being connected by conductor 278 to the receptacle 12. As in the case of control resistors 246 and 248, the rectifier bridge circuits 300 and 308 are connected in opposition whereby the direct-current voltages across resistors 292 and 294 are of opposite polarity so that for any variation in the flow of current through the electrode and in the arc potential, the differential of the direct-current voltages across resistors 292 and 294 controls the direct-current biasing potential on the grids 284 and 286 of the rectifying discharge device 170.

As illustrated, in order to provide for closed circuits through the electric discharge valves 50, 52, 54, and 56 during an automatic operation of the system, the contactors 90 and 110 are disposed to be energized and maintained in a closed circuit position when the system is energized and the master controller 208 is in the position illustrated. For this purpose, contactor 90 is provided with an energizing winding 312, one end of which is connected by conductor 314 to conductor 44, the other end of which is connected by conductor 316 through the contact plate 318 of the master controller 208 and conductor 320 to conductor 42. Similarly, the contact 110 is provided with an energizing winding 322, one end of which is connected by conductor 314 across conductor 44, and the other end of which is connected by conductor 324 through the contact plate 318 and conductor 320 to the conductor 42. The description of all closed circuits referred to hereinbefore are based upon the assumption that the master controller 208 is in its automatic or "off" position, as illustrated in the drawing.

In constructing the system, the self-biasing resistors 200 and 228 are so selected that with the differential of the direct-current voltages across the control resistors zero, the self-biasing resistors function to maintain sufficient bias on the grids of the rectifier discharge devices 140 and 170 that they are sufficiently conducting to pass current through resistors 138 and 168 to maintain a direct current biasing potential on the grids of electric discharge valves 50, 52, 54 and 56 sufficient to block the valves from passing current to the motor 28. Likewise, the blocking resistors 86 and 106 are so selected that as current flows therethrough, a control voltage is obtained thereacross of a polarity such as to place a positive bias on the grids of rectifier discharge valves 170 and 140, respectively, to render the valves conducting when current flows through the respective blocking resistors, the purpose of which will be explained during the explanation of the operation of the system. The transformers 262 and 272 are also selected, having a one to one ratio and being utilized for the purpose of preventing sneak circuits or effects on the grids of the rectifier discharge valves 140 and 170.

In operation, assuming that the system is energized, the electrodes 16, 18, and 20 may be positioned with respect to the metal 14 in the receptacle 12 by any suitable means, such as by manual operation or automatically. Assuming that the initial positioning of the electrodes is to be obtained automatically as soon as the system is energized and power is to be supplied to the arc furnace 10, the windings 312 and 322 of the contactors 90 and 110 are energized to actuate the contactors to their contact-making position. At the same time, a potential exists from the electrode 16 to the metal 14 in the receptacle. This potential is at a maximum, and since the electrodes 18 and 20 are not as yet adjusted, there is no current flow. The high value of the arc potential impresses a high value of direct-current voltage across each of control resistors 248 and 294, and since current is not flowing through the electrode 16, the direct-current voltage across resistors 246 and 292 proportional to the flow of current in the electrode is zero. The direct-current voltage across resistor 248 places a large negative bias on the grids 238 and 240 of rectifier discharge valve 140, whereas the direct-current voltage across resistor 294 places a less negative or a more positive bias on the grids 284 and 286 of the rectifier discharge valve 170.

The bias thus impressed on the grids 284 and 286 of rectifier valve 170 is such that the rectifier discharge valve 170 is rendered conductive, with the result that current flows from the center tap of the secondary winding 220 of transformer 222 through conductor 236, contact plate 234, conductor 232, resistor 168, conductors 172 and 102, blocking resistor 86, conductor 230, self-biasing resistor 228, conductor 226, cathode 224, and anodes 212 and 214 through conductors 216 and 218, respectively, to the terminals of the secondary winding 220 of the transformer 222. Since the direct-current voltage proportional to the arc potential is at a maximum, the conductivity of the rectifier discharge valve 170 is also at a maximum, and maximum current flows through the resistor 168. The flow of current through the resistor 168 renders the direct-current biasing potential on the grids 118 and 120 of the electric discharge valves 54 and 56 more negative so that the grid-cathode potential of those devices is so lowered below the critical potential of the devices that the devices are blocked with the result that no current flows therethrough to the motor 28.

At the same time, the direct-current voltage across the resistor 248 cooperates with the self-biasing resistor 200 to impress a more negative biasing potential on the grids 238 and 240 of the rectifier discharge valve 140 to reduce the conductivity of rectifier 140. By reducing the conductivity of the rectifier discharge valve 140, the current flow through the resistor 138 in the anode-cathode circuit of the rectifier 140 is sufficiently lowered, and with the direct-current biasing potential thus reduced, the resultant grid-cathode potential of the electric discharge valves 50 and 52 rises above the critical potential of the valves, and the valves 50 and 52 become conductive to pass current to the motor 28. This conducting circuit may be traced from the center-tap of the secondary winding 62 of transformer 64 through conductor 92, contact member 88 of contactor 90, blocking resistor 86, conductor 84, the armature winding 30 of the motor 28, conductor 82, and the parallel conductors 78 and 80 to the cathodes 74 and 76, respectively, and anodes 58 and 60, respectively, to the terminals of the secondary winding 62, to so energize the motor 28 as to effect the operation thereof to lower the electrode 16.

The flow of current in the circuit just described through the blocking resistor 86 effects a direct-current control voltage across the blocking resistor 86 which is of the same polarity and is additive to the direct-current voltage existing across the control resistor 294 to positively render the bias on the grids 284 and 286 more positive to insure that the rectifier discharge valve 170 is more conducting, and that the current flow through the resistor 168 is such as to insure that the bias on the grids 118 and 120 of the valves 54 and 56 is sufficiently negative to effectively block the valves 54 and 56 from conducting. The blocking resistor 86 is a necessary addition to this circuit so that it can be used as a sensitive regulating circuit. The negative grid voltage on discharge valves 50, 52, 54, and 56 must be set just below the critical grid voltage gradient of these valves to insure maximum sensitivity. When this is done any increase in anode voltage on either set of valves would cause them to fire due to the condition that the grid voltage is just sufficient to block the alternating current anode potential from transformer windings 62 and 70. If valves 50 and 52 are fired they will cause a direct current voltage to be added to the already existing potential supplied by transformer winding 70 through the common connection lead 82, blocking resistor 106, contacts 108 and lead 112 to transformer winding 70. The presence of the blocking resistor 86 provides positive insurance against the firing of electric discharge valves 54 and 56 as long as the electric discharge valves 50 and 52 are conducting. By energizing the motor 28 in the manner just described, electrode 16 is lowered, and since the other electrodes 18 and 20 are, as yet, not in contact with the metal 14 in the receptacle 12, the electrode 16 is lowered to a position where it engages the metal in the receptacle 12.

In lowering the electrode 16, it is apparent that the potential between the electrode 16 and the metal 14 decreases with the result that the direct-current control voltage across resistors 248 and 294 is so decreased that the bias on the grids of the rectifier discharge valves 140 and 170 is rendered less negative and more negative respectively. By rendering the biasing potential of the grids of the rectifier discharge valve 170 more negative, the current flow through the resistor 168 for controlling the direct-current biasing potential of the discharge devices 54 and 56 more nearly approaches the value where the discharge devices 54 and 56 can be rendered conductive. However, as long as the discharge valves 50 and 52 are conducting and a control voltage is obtained across blocking resistor 86, the bias of the grids of the rectifier discharge valve 170 is such as to insure a negative bias on the discharge valves 54 and 56 to prevent them from conducting.

As soon as the electrodes 18 and 20 are actuated in a similar manner to a point where a circuit is completed through the electrodes 16, 18, and 20, in conjunction with the metal 14, maximum current flows through the electrode 16 and a direct-current voltage proportional to the current is imposed across each of control resistors 246 and 292 with the result that the differential of the direct-current voltages across control resistors 246—248 and 292—294 is such as to place a less negative bias on the grids of rectifier valve 140 and a more negative bias on the grids of the rectifier discharge valve 170.

The less negative or more positive bias on the grids 238 and 240 of the rectifier discharge valve 140 renders the rectifier 140 conducting so that current flows through the circuit, which may be traced from the center tap of the secondary winding 192 of transformer 194 through conductor 210, contact plate 206, conductor 204, resistor 138, conductors 142, 82, and 104, a blocking resistor 106, conductor 202, self-biasing resistor 200, conductor 198, cathode 196, and anodes 184 and 186, and conductors 188 and 190, respectively, to the terminals of the secondary winding 192. The current flowing through that part of resistor 138 in the grid-cathode circuit of the electric discharge valves 50 and 52 is such as to render the direct-current biasing potential on the grids 114 and 116 of the valves 50 and 52, respectively, more negative to effectively block the firing of the valves and prevent the flow of current therethrough to the motor 28. When the electric valves 50 and 52 cease to conduct, the control voltage across the blocking resistor 86 becomes zero so that the blocking resistor 86 has no effect on the operation of the rectifier discharge valve 170.

On the other hand, the change in the biasing potential of the grids 284 and 286 of the rectifier discharge valve 170 is such as to effectively block the passing of current by the rectifier discharge valve 170, with the result that the current flow through the resistor 168 is so decreased or becomes zero, that the direct-current biasing potential on the grids 118 and 120 of the electric discharge valves 54 and 56, respectively, becomes less negative or more positive, and the valves 54 and 56 become conducting to pass current to the motor 28. This conducting circuit may be traced from the center-tap of the secondary winding 70 of transformer 72 through conductor 112, contact member 108, blocking resistor 106, conductor 104, conductor 82, the armature windings 30, conductors 84 and 102, and the parallel conductors 98 and 100, cathodes 94 and 96, respectively, and anodes 66 and 68, respectively, to the terminals of the secondary winding 70 to so energize the motor 28 as to effect an operation thereof in a direction to raise the electrode 16.

At the same time that the electric discharge valves 54 and 56 become conducting, the current flow through blocking resistor 106 is such that the direct-current voltage across the blocking resistor 106 is of a polarity for cooperating with the differential of the control voltages across resistors 246 and 248 to maintain a positive bias on the grids 238 and 240 of the rectifier discharge valve 140, whereby the rectifier 140 is maintained sufficiently conductive that current flows through the resistor 138 to maintain a direct-current biasing potential on the grids 114 and 116 of the electric discharge valves 50 and 52, respectively, to effectively block the firing of these valves. The resistor 106 thus functions in a manner similar to resistor 86 in that when the electric discharge valves 54 and 56 are conducting, the resistor 106 provides a positive control for preventing the firing of the discharge valves 50 and 52.

The electrode 16 is thus raised to a position for ideal operation of the arc furnace, in which position the direct-current voltage across control resistors 248 and 294 which is proportional to the arc potential, and the direct-current voltage across resistors 246 and 292 which is proportional to the current flow through the electrode 16, are balanced so that there is a zero differential of direct-current voltage across the series-connected resistors 248—246 and the series connected resistors 292—294. With the differential voltages zero as described, the self-biasing resistors 200 and 228 function to maintain sufficient bias on the grids of the rectifier discharge valves 140 and 170, whereby they are sufficiently conducting to pass sufficient current through resistors 138 and 168, respectively, that the direct-current biasing potential on the grids of electric discharge valves 50, 52, 54, and 56 is sufficient to block the valves from passing current to the motor 28.

If the ideal operating condition for the arc furnace 10 is changed in any manner whatsoever, the balance of the voltage across the control resistors is upset, with the result that the bias on the grids of the rectifier discharge valves 140 and 170 is changed to effect the operation of the motor 28 in a predetermined direction, depending upon the change in the ideal operating conditions. If, for example, the electrode 16 should come in contact with the metal 14 as by reason of a cave-in of the metal, the arc potential is reduced to a minimum, and the current flowing through the electrode is increased to a maximum with the result that the differential of the direct-current voltages across resistors 246 and 248 is of such a polarity as to render the grids of the rectifier discharge valve 140 more positive and thereby render the discharge valve 140 conductive. As in the earlier illustration, when the rectifier 140 is rendered conductive, the flow of current through the resistor 138 so changes the grid-cathode potential of the electric discharge valves 50 and 52 as to effectively block them.

At the same time, the differential of the control voltages across resistors 292 and 294 is such as to place a negative bias on the grids of the rectifier 170 to effectively block the rectifier 170 and thereby prevent the rectifier 170 from passing current through the resistor 168. The decrease in the current flowing through resistor 168 so changes the direct-current biasing potential on the electric discharge valves 54 and 56 that they are rendered less negative, and the valves 54 and 56 pass current to the motor 28 to raise the electrode 16.

As will be appreciated, any unbalance in the direct-current voltages across the control resistors in response to a change in the ideal operating conditions for the electrode 16 effects an immediate change in the current flowing through the armature windings 30 of the motor 28 so that a direct control of the direction of operation of the motor 28 is obtained, and as the motor is operated to move the electrode 16 to its ideal operating position, the speed of the motor is so changed as to decrease the speed of the movement of the electrode as it approaches its ideal operating position and thereby prevent an overrun in the positioning of the electrode. The presence of the blocking resistors 86 and 106 in the system insures a positive blocking of one set of the electric valves in the motor circuit when the other set of electric valves are conductive.

In operation, it is sometimes desirable to effect a raising or lowering of the electrodes manually, irrespective of the load demands on the system. The master controller 208 makes it possible to manually control the positioning of the electrode 16 irrespective of the load demand. Thus, if the load demand is such as to effect an operation of the motor 28 to lower the electrode 16, the electrode 16 can still be raised by operating the master controller 208 to the right, as indicated in the drawing, to the "raise" position, in which position the winding 312 of the contactor 90 is deenergized, and contact plates 234, 258, and 304 are moved to the right to interrupt the conducting circuit of the rectifier discharge valve 170 and the circuit across the control resistors 248, 246, and 292, respectively. The circuit between the rectifier bridge 308 and the control resistor 294 need not be interrupted, as the control voltage across the resistor 294 is of a polarity to apply a positive bias to the grids of the rectifier 170.

With the master controller 208 manually operated to the "raise" position, the winding 322 of contactor 110 is energized to maintain the contact member 108 in a circuit closing position, and since the movement of the contact plate 234 opens the circuit of the rectifier tube 170, the direct-current biasing potential occasioned by reason of current flow through the resistor 168 is zero, with the result that the potential of the grids 118 and 120 of electric discharge valves 54 and 56 becomes less negative or more positive, whereby the discharge valves 54 and 56 are rendered conductive, and current flows in the motor circuit in a direction to operate the motor to effectively raise the electrode 16 regardless of the load demand. At the same time that the motor 28 is thus energized, and the current flow through the blocking resistor 106 is such that the control voltage across the resistor 106 is such as to insure a positive biasing potential on the grids of the rectifier 140, whereby the current flow through the resistor 138 is such as to provide a negative biasing potential on the electric discharge valves 50 and 52 to prevent them from firing.

If, on the other hand, it is desired to manually lower the electrode 16 regardless of the load demand on the system, the master controller 208 is actuated to the left, as viewed in the illustration, to the position where the circuit to the winding 322 of contactor 110 is opened to deenergize the contactor and permit contact member 108 to drop to its open circuit position, and contact plates 206, 234, 258, and 304 are actuated toward the left whereby the grid cathode circuit of the rectifier 140 is interrupted, and the circuits for impressing a control voltage across resistors 248, 246, and 292 are also disconnected.

With the master controller 208 in this position, opening the anode-cathode circuit of the rectifier 140 results in a decrease of the direct-current biasing potential on the cathodes 114 and 116 of the electric discharge valves 50 and 52, whereby the valves 50 and 52 become conducting to pass current to the motor 28 and effect its operation in a direction to lower the electrode 16. At the same time as the current flows through the armature winding of the motor 28, a control voltage is obtained across blocking resistor 86, the control voltage having a polarity for rendering the rectifier discharge valve 170 conducting, whereby the flow of direct current through the resistor 168 provides a direct-current biasing potential on the grids of the electric discharge valves 54 and 56 to effectively block the valves.

The system of this invention is very sensitive, giving quick response to operating conditions in the control of the motor, and by utilizing the full-wave rectifier discharge devices in the manner described, a simplification of the circuits is obtained. The full-wave rectifier valves utilized perform not only the function of rectifying, but also of amplifying and controlling the system. Further, by employing the blocking resistors as described hereinbefore, positive assurance in the selective control of the pairs of electric valves for controlling the direction and speed of operation of the motor is obtained.

Although this invention has been described with reference to a particular embodiment, it is, of course, not to be limited thereto except insofar as is necessitated by the scope of the appended claims.

I claim as my invention:

1. In a regulating system, a dynamo-electric machine which is to be regulated, a plurality of sources of direct current control voltages responsive to the operation of the dynamo-electric machine, full-wave rectifier discharge valves having grids connected in circuit with the sources of control voltages whereby the sources control the conductivity of the rectifier discharge valves, a plurality of pairs of electric discharge valves connected in circuit relation with the rectifier discharge valves whereby the rectifier discharge valves selectively control the conductivity of the pairs of electric discharge valves, the pairs of electric discharge valves being disposed to selectively connect the dynamo-electric machine to a source of alternating current to control the operation of the machine, and means connected in circuit relation with the pairs of electric discharge valves and the rectifier discharge valves operative when one pair of electric discharge valves is conducting to positively prevent the other pair of electric discharge valves from conducting.

2. In a regulating system, a dynamo-electric machine which is to be regulated, a plurality of sources of direct current control voltages responsive to the operation of the dynamo-electric machine, full-wave rectifier discharge valves having grids connected in circuit with the sources of control voltages whereby the sources control the conductivity of the rectifier discharge valves, a plurality of pairs of electric discharge valves connected in circuit relation with the rectifier discharge valves whereby the rectifier discharge valves selectively control the conductivity of the pairs of electric discharge valves, the pairs of electric discharge valves being disposed to selectively connect the dynamo-electric machine to a source of alternating current to control the operation of the machine, and a pair of resistors connected in circuit between the pairs of electric discharge valves and the dynamo-electric machine, the resistor connected in circuit with one of the pair of electric discharge valves being connected in circuit relation with the other pair of electric discharge valves to prevent the other pair from conducting when the one pair is conducting.

3. In a regulating system, a dynamo-electric machine which is to be regulated, a plurality of sources of direct current voltages responsive to the operation of the dynamo-electric machine, a pair of full-wave rectifier discharge valves, each of the rectifier valves having a pair of grids which are connected in circuit with a source of control voltage, the sources thereby controlling the conductivity of the rectifier discharge valves connected in circuit therewith, a plurality of pairs of electric discharge valves disposed to selectively connect the dynamo-electric machine to a source of alternating current, each of the rectifier discharge valves being connected to an associated pair of the electric valves to control the conductivity thereof, and means connected in circuit relation with one of the pairs of electric valves and the rectifier discharge valve associated with the other pair of electric valves operative when the one pair is conducting to positively maintain the rectifier discharge valve conductive and thereby effectively block the other pair of electric valves associated therewith.

4. In a regulating system, a motor which is to be regulated, a pair of variable voltage sources supplied from an alternating current source, a plurality of sets of rectifiers, one of the rectifiers of each set being inductively disposed to be responsive to one of the pair of variable voltage sources, the other rectifier of each set being connected to be responsive to the other of the pair of variable voltage sources, a full-wave rectifier discharge valve electrically associated with each set of rectifiers, each of the full-wave rectifier discharge valves having grids connected in circuit relation to the associated set of rectifiers whereby the rectifiers control the conductivity of the rectifier discharge valves, a plurality of pairs of electric discharge valves connected in circuit relation with the rectifier discharge valves whereby the rectifier discharge valves selectively control the conductivity of the pairs of electric discharge valves, the pairs of electric discharge valves being disposed to selectively connect the motor to a source of alternating current to control the speed and direction of operation of the motor, and means connected in circuit relation with the pairs of electric discharge valves and the rectifier discharge valves operative when one pair of electric discharge valves is conducting to positively prevent the other pair of electric discharge valves from conducting.

5. In a regulating system, a motor which is to be regulated, a pair of variable voltage sources supplied from an alternating current source, a plurality of sets of rectifiers, one of the rectifiers of each set being inductively disposed to be responsive to one of the pair of variable voltage sources, the other rectifier of each set being connected to be responsive to the other of the pair of variable voltage sources, a full-wave rectifier discharge valve electrically associated with each set of rectifiers, each of the full-wave rectifier discharge valves having grids connected in circuit relation to the associated set of rectifiers whereby the rectifiers control the conductivity of the rectifier discharge valves, a plurality of pairs of electric discharge valves connected in circuit relation with the rectifier discharge valves whereby the rectifier discharge valves selectively control the conductivity of the pairs of electric discharge valves, the pairs of electric discharge valves being disposed to selectively connect the motor to a source of alternating current to control the speed and direction of operation of the motor, and a source of control voltage proportional to the conductivity of one pair of electric discharge valves connected in circuit relation with the other pair of electric discharge valves to positively prevent the other pair of electric discharge valves from conducting when the one pair is conducting.

6. In a regulating system, a motor which is to be regulated, a pair of variable voltage sources supplied from an alternating current source, a plurality of sets of rectifiers, one of the rectifiers of each set being inductively disposed to be responsive to one of the pair of variable voltage sources, the other rectifier of each set being connected to be responsive to the other of the pair of variable voltage sources, a full-wave rectifier discharge valve electrically associated with each set of rectifiers, each of the full-wave rectifier discharge valves having grids connected in circuit relation to the associated set of rectifiers whereby the rectifiers control the conductivity of the rectifier discharge valves, a plurality of pairs of electric discharge valves connected in circuit relation with the rectifier discharge valves whereby the rectifier discharge valves selectively control the conductivity of the pairs of electric discharge valves, the pairs of electric discharge valves being disposed to selectively connect the motor to a source of alternating current to control the speed and direction of operation of the motor, and a pair of resistors connected in circuit between the pairs of electric discharge valves and the motor, the resistor connected in circuit with one of the pair of electric discharge valves being connected in circuit relation with the other pair of electric discharge valves to prevent the other pair from conducting when the one pair is conducting.

7. In a control system for regulating the feeding of an electrode for producing and maintaining an electric arc, the combination comprising, a feed motor which is to be regulated, a pair of variable voltage sources supplied from an alternating current source, a plurality of pairs of rectifiers selectively connected to said pair of variable voltage sources to provide a plurality of pairs of sources of direct current control voltage, a pair of full-wave rectifier discharge valves, each of the rectifier valves having a pair of grids which are connected in circuit with a pair of the sources of direct current control voltage, the pair of sources of direct current control voltage thereby controlling the conductivity of the rectifier discharge valve connected in circuit therewith, a plurality of pairs of electric discharge valves disposed to selectively connect the motor to a source of alternating current to control the speed and direction of operation of the motor, each of the rectifier discharge valves being connected to an associated pair of the electric valves to control the conductivity thereof, and means connected in circuit relation with one of the pairs of electric valves and the rectifier discharge valve associated with the other pair of electric valves operative when the one pair is conducting to positively maintain the rectifier discharge valve conductive and thereby effectively block the other pair of electric valves associated therewith.

8. In a control system for regulating the feeding of an electrode for producing and maintaining an electric arc, the combination comprising, a feed motor which is to be regulated, a pair of variable voltage sources supplied from an alternating current source, a plurality of pairs of rectifiers, one of the rectifiers of each pair being inductively disposed to be responsive to one of the pair of variable voltage sources, the other rectifier of each pair being connected to be responsive to the other of the pair of variable voltage sources, a pair of full-wave rectifier discharge valves each of which is connected in circuit relation with and disposed to be controlled by a different pair of the rectifiers, a plurality of pairs of electric discharge valves disposed to selectively connect the motor to a source of alternating current to control the speed and direction of operation of the motor, each of the rectifier discharge valves being connected to an associated pair of the electric valves to control the conductivity thereof, and a resistor connected in circuit relation with one of the pairs of electric valves and the rectifier discharge valve associated with the other pair of electric valves operative when the one pair is conducting to positively prevent the other pair of electric valves from conducting.

9. In a control system for regulating the feeding of an electrode for producing and maintaining an electric arc, the combination comprising, a motor which is to be regulated, a plurality of pairs of electric valves disposed to selectively connect the motor to a source of alternating current to control the speed and direction of operation of the motor, each pair of electric valves having a control circuit associated therewith for controlling the conductivity thereof, each control circuit having a full-wave rectifier discharge valve connected in circuit relation therewith for altering the characteristics of the control circuit, a plurality of pairs of variable sources of direct current control voltages, each pair of sources being connected in circuit relation with an associated rectifier discharge valve to control the conductivity thereof, and a source of control voltage variable in response to the conductivity of one of the pairs of electric valves connected in circuit with the rectifier discharge valve and pair of sources of direct current control voltage associated with the other pair of electric valves for insuring the blocking of the other pair of electric valves when the one pair is conducting.

10. In a control system for regulating the feeding of an electrode for producing and maintaining an electric arc, the combination comprising, a motor which is to be regulated, a plurality of pairs of electric valves disposed to selectively connect the motor to a source of alternating current to control the speed and direction of operation of the motor, each pair of electric valves having a control circuit associated therewith for controlling the conductivity thereof, each control circuit having a full-wave rectifier discharge valve connected in circuit relation therewith for altering the characteristics of the control circuit, a plurality of pairs of variable sources of direct current control voltages, each pair of sources being connected in circuit relation with an associated rectifier discharge valve to control the conductivity thereof, and means connected in circuit relation with one of the pairs of electric valves and the rectifier discharge valve associated with the other pair of electric valves operative when the one pair is conductive to positively maintain the rectifier discharge valve conductive and thereby effectively block the other pair of electric valves associated therewith.

JACK E. REILLY.